United States Patent [19]

Lew

[11] 4,411,291
[45] Oct. 25, 1983

[54] ANGULAR BELT VALVE FOR MANIFOLD CONTROL

[76] Inventor: Hyok S. Lew, 7890 Oak St., Arvada, Colo. 80005

[21] Appl. No.: 279,678

[22] Filed: Jul. 2, 1981

Related U.S. Application Data

[63] Continuation-in-part of Ser. No. 206,302, Nov. 12, 1980.

[51] Int. Cl.³ .................... F16K 13/00; F16K 31/52
[52] U.S. Cl. .................. 137/624.15; 137/625.15; 137/DIG. 2
[58] Field of Search ........... 137/624.15, 624.2, 625.11, 137/625.15; 251/DIG. 2

[56] References Cited

U.S. PATENT DOCUMENTS

| | | | |
|---|---|---|---|
| 1,447,007 | 2/1923 | Barnebl, Jr. | 137/624.15 |
| 1,590,558 | 6/1926 | Stenhouse | 137/625.15 |
| 3,154,104 | 10/1964 | Alamprese | 251/DIG. 2 |

FOREIGN PATENT DOCUMENTS

1650394  8/1970  Fed. Rep. of Germany . 251/DIG. 2

Primary Examiner—John J. Vrablik

[57] ABSTRACT

This invention relates to a rotary valve with multiple manifold comprising a manifold core including a plurality of ports disposed around the cylindrical surface of said manifold core, each of which ports is connected to each of a plurality of the axial holes disposed within said manifold core, a planetary roller and a belt wrapped around said manifold core and said planetary roller, which combination is enclosed within a sealed enclosure with an inlet. The other ends of said plurality of the axial holes open to the outside of said enclosure provide the multiple outlets. As the angular position of said planetary roller relative to said manifold core is varied, each of said plurality of ports disposed around the cylindrical surface of said manifold core becomes open when it is located within the unwrapped angle of said belt around said manifold core and becomes closed when it is within the wrapped angle.

5 Claims, 4 Drawing Figures

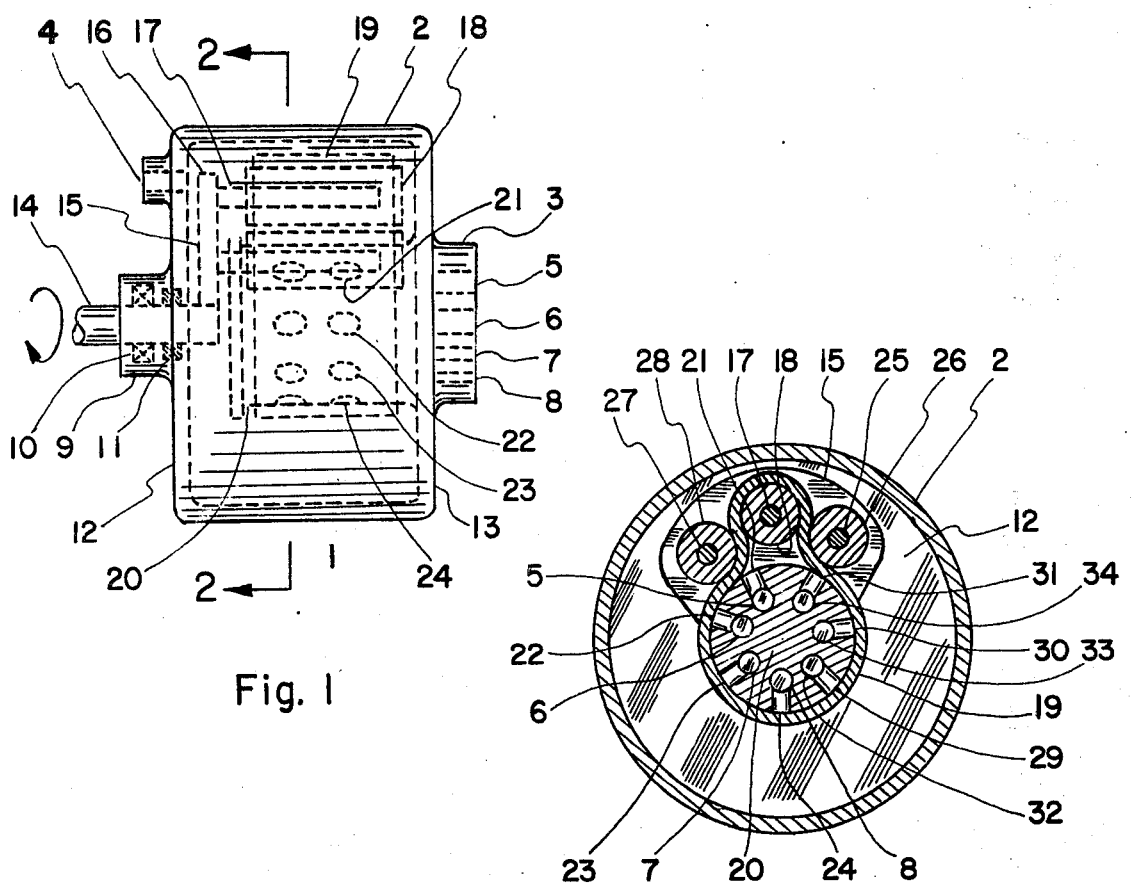
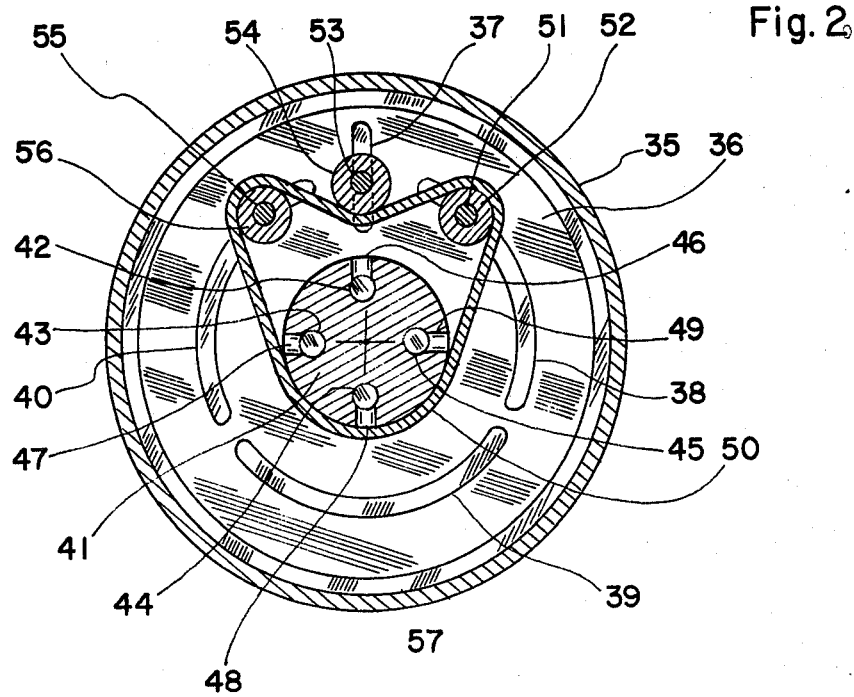
Fig. 1
Fig. 2
Fig. 3

ANGULAR BELT VALVE FOR MANIFOLD CONTROL

This patent application is a CONTINUATION-IN-PART application to a patent application Ser. No. 06/206,302 entitled "Angular Position Belt Valve Pump" filed on Nov. 12, 1980.

Many valves available in the present day commercial market designed for controlling a manifold inlets or outlets comprise an assembly of a plurality of the single port valves which are centrally controlled. One well known example of such cases is the arrangement of the manifold valve system employed in the automatic lawn sprinkler system, which is expensive to install and requires an expensive control system. There are valves designed to handle the manifold control wherein the multiple ports are integrally constructed into a single valve assembly, which type of valves are very expensive in general. When one examines the manifold valve system employed in the present day automatic lawn sprinkler system or the blow back cleaning systems of the bag filter type dust collectors, one realizes that there is a great need for more simpler and inexpensive manifold control valves.

The primary object of the present invention is to provide a manifold control valve which does not employ any rubbing seals.

Another object of the present invention is to provide a manifold control valve which is inexpensive, long lasting and easy to control.

A further object of the present invention is to provide a manifold control valve that can be mechanically programmed.

Yet another object of the present invention is to provide the angular belt valve particularly suitable for the applications is the automatic lawn sprinkler system and in the blow-back cleaning of the bag filters of the dust collecting system.

These and other objects of the present invention will become clear as the description of the present invention proceeds. The present invention may be described with a greater clarity and specificity by referring to the following Figures:

FIG. 1 illustrates a side view of the angular belt valve constructed in accordance with the principles of the present invention.

FIG. 2 illustrates a cross section of the angular belt valve taken along the plane 2—2 as shown in FIG. 1.

FIG. 3 illustrates a cross section of another embodiment of the angular belt valve.

Figure 4:
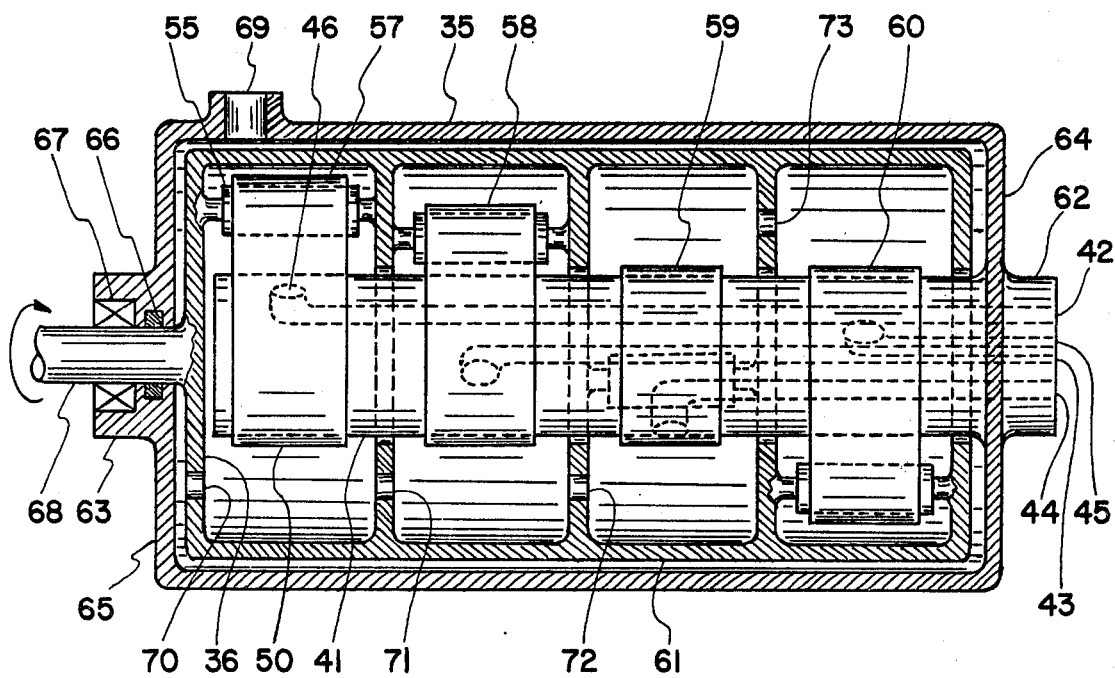
FIG. 4 illustrates an assembly of a plurality of the angular belt valves shown in FIG. 3 arranged in series.

There is shown in FIG. 1 a side view of the angular belt valve 1 for manifold control, which is constructed in accordance with the principles of the present invention. The angular belt valve 1 comprises a cylindrical enclosure including a side wall 2, one end wall 12 and the other end wall 13 wherein the other end wall 13 includes a cylindrical manifold core 20 rigidly attached to the end wall 13 and extruding into the inside of said enclosure. The other extremity of said cylindrical manifold core 3 is exposed to the out side of the enclosure. The cylindrical manifold core 20 includes a plurality of the axial holes connecting the ports 5, 6, 7, 8, etc. disposed on the outside end of the cylindrical manifold core 20 to the openings 21, 22, 23, 24, etc., respectively, disposed on the cylindrical surface of the manifold core 20. There may be more than one openings on the cylindrical surface of the manifold cores for each of the axial holes, which arrangement is advantageous when the present invention is used in conjunction with a very high pressure fluid. The end wall 12 includes a hub 9 rotatably engaged by a shaft 14 which shaft extends from outside of the enclosure to the inside. The bearing 10 allows the shaft to rotate relative to the hub, while the seal 11 seals off fluid from leaking. An arm plate 15 extending in the radial direction from the shaft 14 includes another shaft 17 disposed at an extremity 16, to which shaft a planetary roller 18 is rotatably disposed. The arm plate 15 may include a further tightener rollers as to be explained in conjunction with FIG. 2. A belt 19 is wrapped around the planetary roller 18 and the cylindrical manifold core 20. A port 4 is disposed through the enclosure to provide an inlet for the fluid.

In FIG. 2, there is shown a cross section of the angular belt valve taken along a plane 2—2 as shown in FIG. 1. Each of the axial holes 5, 6, 7, 8, 32, 33, 34 etc. with one end openings disposed on the outside end of the cylindrical manifold core has each of the other end openings 21, 22, 23, 24, 29, 30, 31 etc. disposed around the cylindrical surface of the cylindrical manifold core. In addition to the planetary roller 18 rotatably disposed on the shaft 17, the arm plate 15 further includes a pair of the tightener rollers 26 and 27 rotatably disposed on the shafts 25 and 28, respectively, which shafts are rigidly attached to the arm plate 15. While the belt 19 is wrapped around the planetary roller 18 and the cylindrical manifold core 20, the pair of the tightener rollers 26 and 27 are employed to adjust the unwrap angle of the belt 19 around the cylindrical manifold core 20.

The angular belt valve of the construction as shown in FIGS. 1 and 2 operates in the following manner: When the assembly of the planetary roller 18 and the tightener rollers 26 and 27 mounted on the arm plate 15 are rotated around the cylindrical manifold core 20, the openings of the axial holes disposed on the cylindrical surface of the cylindrical manifold core become open one at a time or two at a time depending on the size of the unwrap angle as they move into the zone of the unwrapped angle and become closed when they move back to the zone of the wrapped angle. Such a rotational motion of the arm plate can be realized by rotating the shaft 14 while holding the enclosure of the angular belt valve stationary or vice versa. Therefore, when the port 4 is connected to the supply line of a pressurized fluid such as the compressed air or pressurized water, the fluid can be made to discharge through the plurality of the ports 5, 6, 7, 8, 32, 33, 34 etc. one at a time in a cyclic fashion by rotating the shaft 14 continuously or impulsively at a slow speed. Since there is no rubbing seal included in opening and closing the openings of the manifold other than the rotating seal 11, there is no parts subjected to the severe wear. The fluid pressure within the enclosure of the angular belt valve always presses the belt 19 onto the cylindrical surface of the cylindrical manifold core 20 and, consequently, an excellent closure of all of the openings located within the wrapped angular zone is automatically guaranted even without using any sizable tension on the belt. When the angular belt valve is used in conjunction with a high pressure fluid, a plurality of small holes may be disposed on the cylindrical surface of the cylindrical manifold core for each of the axial holes in place of a single large hole. It should be mentioned that the shaft 14 may be rotated by a air motor or a hydraulic motor which is powered by the fluid directed to the inlet port 4.

In FIG. 3, there is shown a cross section of another embodiment of the angular belt valve 57 which includes means for adjusting the timing and duration of the manifold openings, which embodiment has a structure similar to that shown in FIG. 2, wherein a round disc 36 disposed within the enclosure 35 and around the cylindrical manifold core 41 is employed in place of the arm plate 15 of FIG. 2. A pair of the planetary rollers 52 and 56 rotatably disposed on the shafts 51 and 55, respectively, which shafts are rigidly attached to the disc 36, and a tightener roller 54 rotatably disposed on the shaft 53 adjustably attached to the disc 36 by means of a slotted mounting holes, are rotatably arranged about the cylindrical manifold core 41 including a plurality of the axial holes 42, 43, 44, 45 etc, of which axial holes only one hole 42 is open to the cylindrical surface of the cylindrical manifold core 41 through an opening 46 while the openings to the cylindrical surface of the other holes are plugged up by the plugs 47, 48, 49 etc. The belt 50 around the pair of the planetary rollers 52 and 56 and the cylindrical manifold core 41 is tightened by the tightener roller 54. As the pair of the planetary rollers are or can be mounted on a slotted mounting arcuated cut outs 38, 39, 40 etc., the unwrap angle of the belt 50 can be adjusted to provide the required duration of the opening for the opening 46.

In FIG. 4 there is shown an assembly including a plurality of the angular belt valves shown in FIG. 3 which are assembled in series. A plurality of the angular belt valves 57, 58, 59, 60 etc. having the structure essentially same as that shown in FIG. 3 are assembled in series wherein a common cylindrical manifold core 41 disposed through the central openings cut through a series of the discs 36, 74, 75, 76, 78 etc. supporting the planetary rollers, which discs are attached to a common cylindrical shell 61 rigidly connected to the shaft 68 is included. The bearing 67 allows the rotational movement of the shaft relative to the hub 63 disposed on the end wall 65 while the seal 66 prevents the fluid from leaking. An inlet port 69 is provided through the cylindrical side wall 35 and a further fluid passages 70, 71, 72, 73 etc. are included in order to supply the fluid to each of the angular belt valves constituting the assembly in series. The end wall 64 through which the cylindrical manifold core extends to the outside of the enclosure includes the manifold outlets disposed on the protruded portion of said end wall 62. With the arrangement shown in FIG. 4, the timing and the duration of the opening of each of the manifolds can be independently adjusted for each port.

While the principles of the invention have now been made clear by the illustrative embodiment, there will be immediately obvious to those skilled in the art many modifications of the structure, arrangement, proportions, elements and materials particularly adapted to the specific environment and the operating requirement in the practice of the invention without departing from those principles of the present invention.

I claim:

1. An angular belt valve comprising a cylindrical enclosure having ports for the fluid passage; a cylindrical manifold core disposed within said cylindrical enclosure, said cylindrical manifold core including a plurality of axial holes, each of which axial holes include first openings disposed on the outside extremity of said cylindrical manifold core and second openings disposed on the cyindrical side wall of said cylindrical manifold core; a planetary roller disposed within said cylindrical enclosure, said planetary roller revolvable about its own axis and rotatable around said cylindrical manifold core; a belt wrapped around said cylindrical manifold core and said planetary roller; means for generating relative rotational motion between said cylindrical manifold core and said planetary roller; a plurality of tightener rollers rotatable around said cylindrical manifold core and means for adjusting the relative positions between said planetary roller and said tightener rollers; whereby, the relative rotational motion between said cylindrical manifold core and said planetary roller opens and closes each of said second openings connected to each of said axial holes wherein said means for adjusting the relative positions between said planetary roller and said tightener rollers is used for adjusting the unwrap angle of said belt around said cylindrical manifold core and for tightening the tension on said belt.

2. The combination as set forth in claim 1 wherein a plurality of said angular belt valves are assembled in series wherein a common cylindrical manifold core is employed.

3. An angular belt valve comprising a cylindrical enclosure having a plurality of ports for the fluid passage; a cylindrical manifold core disposed within said cylindrical enclosure, said cylindrical manifold core including a plurality of axial holes having first openings disposed on the outside extremity of said cylindrical manifold core and second openings disposed on the cylindrical surface of said cylindrical manifold core; a planetary roller disposed within said cylindrical enclosure, said planetary roller revolvable about its own axis substantially parallel to the axis of said cylindrical manifold core and rotatable around said cylindrical manifold core; a belt wrapped around said cylindrical manifold core over a wrap angle of a sizable magnitude and less than 360 degrees enclosing said cylindrical manifold core and said planetary roller within the loop of said belt wherein said planetary roller train the path and maintains the wrap angle of said belt; means for generating relative rotational motion between said cylindrical manifold core and said planetary roller; whereby, said relative rotational motion opens and closes each of second openings disposed on the cylindrical surface of said cylindrical manifold core in cyclic fashion as said second openings become wrapped and unwrapped cyclically by said belt, and a plurality of tightener rollers revolvable about their own axes substantially parallel to the axis of said cylindrical manifold core and rotatable around said cylindrical manifold core, wherein said plurality of tightener rollers disposed outside of the loop of said belt and under pressurized rolling contact with said belt imposing a tension on said belt and adjustably maintaining the unwrap angle of said belt around said cylindrical manifold core.

4. The combination as set forth in claim 3 wherein said one or more planetary rollers and said one or more tightener rollers are adjustably affixed in a plurality of slotted openings disposed on a plane substantially perpendicular to the axis of said cylindrical manifold core; whereby, the unwrap angle of said belt can be adjusted.

5. The combination as set forth in claim 4 wherein a plurality of said angular belt valves are assembled in a series wherein a common cylindrical manifold core is employed.

* * * * *